United States Patent [19]

Hirota et al.

[11] 4,042,645
[45] Aug. 16, 1977

[54] PROCESS FOR PRODUCING THERMOSETTING FINISHING POWDERS

[75] Inventors: Kuniomi Hirota, Kamakura; Akio Masumoto, Yokohama; Hiroshi Ozawa, Yokohama; Nobuki Kobayashi, Yokohama; Teruo Honda, Hiratsuka, all of Japan

[73] Assignee: Mitsui Toatsu Chemicals, Incorporated, Tokyo, Japan

[21] Appl. No.: 426,954

[22] Filed: Dec. 13, 1973

Related U.S. Application Data

[63] Continuation-in-part of Ser. No. 91,197, Nov. 19, 1970, abandoned.

[30] Foreign Application Priority Data

Nov. 27, 1969 Japan ................................ 44-94624
Dec. 29, 1969 Japan ................................ 45-988
Feb. 12, 1970 Japan ................................ 45-11482

[51] Int. Cl.² ........................... C08F 2/20; C08F 6/00; C08L 33/04
[52] U.S. Cl. ............................ 260/830 P; 260/42.28; 260/42.44; 260/78.41; 260/79.3 R; 260/835; 260/836; 260/837 R; 427/27; 428/220; 428/463; 526/16; 526/49; 526/56; 526/78; 526/86; 526/271; 526/317; 526/318; 526/320; 526/321; 528/502; 528/503
[58] Field of Search ............ 260/78.5 R, 80.72, 80.75, 260/80.8, 86.1 E, 86.1 R, 78.4 EP, 78.4 D, 837 R, 836, 835, 78.41, 79.3 R, 830 P; 526/78, 16, 49, 56, 86; 528/502

[56] References Cited

U.S. PATENT DOCUMENTS

| | | | |
|---|---|---|---|
| 2,851,448 | 9/1958 | Slocombe et al. | 260/86.1 |
| 2,857,354 | 10/1958 | Fang | 260/33.2 |
| 2,958,611 | 11/1960 | Ulrich | 260/86.1 E |
| 3,082,184 | 3/1963 | Falgiatore et al. | 260/80.75 |
| 3,242,123 | 3/1966 | Mayfield et al. | 260/29.6 |
| 3,446,784 | 5/1969 | Kao | 260/78.5 |
| 3,555,111 | 1/1971 | Benham | 260/835 |
| 3,560,605 | 2/1971 | Sigoel et al. | 264/328 |
| 3,652,476 | 3/1972 | Fellers et al. | 260/80.72 |
| 3,787,340 | 1/1974 | Labana | 260/23 XA |
| 3,845,010 | 10/1974 | Labana et al. | 260/42.18 |
| 3,845,016 | 10/1974 | Labana et al. | 260/42.18 |

FOREIGN PATENT DOCUMENTS

| | | | |
|---|---|---|---|
| 675,299 | 12/1963 | Canada | 260/80.72 |
| 725,468 | 3/1955 | United Kingdom | 260/80.72 |

*Primary Examiner*—Stanford M. Levin
*Attorney, Agent, or Firm*—Eugene Sabol

[57] ABSTRACT

Solid copolymers are produced by copolymerizing a mixture of: (A) at least 30% by weight of a monomer having the formula:

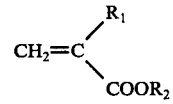

wherein $R_1$ is H or $CH_3$ and $R_2$ is an alkyl radical containing from 1 to 14 carbon atoms; (B) from 3 to 20% by weight of an ethylenic $\alpha, \beta$ unsaturated carboxylic acid or anhydride thereof, or from 3 to 40% by weight of glycidyl acrylate or glycidyl methacrylate; and (C) from 0 to 67% by weight of a monomer copolymerizable with said monomers (A) and (B). Preferably, the mixture is first bulk-polymerized until conversion to the copolymer is from 10 to 80% by weight and the polymerization is completed by suspension-polymerization. Thermosetting solid coating compositions are produced by mixing a major proportion of a solid copolymer so produced with a minor proportion of a cross-linking compound or with an epoxy resin containing at least 2 epoxy radicals in the molecule in presence of a tertiary amine curing accelerator.

6 Claims, No Drawings

PROCESS FOR PRODUCING THERMOSETTING FINISHING POWDERS

CROSS-REFERENCE TO RELATED APPLICATION

This application is a continuation-in-part of Serial No. 91,197 filed Nov. 19, 1970, now abandoned.

BACKGROUND OF THE INVENTION

1. Field of the Invention

The present invention relates to a process for producing thermosetting finishing powders to be used in coating processes in powder form. More particularly, the present invention relates to a process for producing a thermosetting finishing powder which is high in thermal fluidity during baking when applied as a coating to such base materials as metal and is very high in such properties as thermal stability, resistance to solvents, metal adhesion, mechanical strength and durability against weathering when it has been thermoset.

2. Description of the Prior Art.

In the coating of metals and the like, solvent-type paints made by dispersing synthetic resins and pigments in solvents, water-soluble paints and emulsion paints have been extensively used. Recently a technique for coating paint in the form of a powder free from such volatile ingredients as solvent or water by an electrostatic coating method or fluidized bed process has been developed and has been practiced to a certain extent.

The resin ingredients most conventionally used today for finishing powders typically include vinyl chloride resins or epoxy resins. However, these resins exhibit defects which tend to greatly restrict their practical use in paints. For example, the vinyl chloride type finishing powders are thermally unstable due to the dehydrochlorination of vinyl chloride, are so thermoplastic that they have low resistance to solvents and adhere so poorly to metals that a primer must be used in most cases. On the other hand, the epoxy resin type finishing powders are made by using a curing agent such as a polyamide, polyamine or acid anhydride, but are so low in durability to weathering that they cannot be used for out-of-doors applications.

In thermoplastic solid acrylic resins wherein the reactive monomers are not copolymerized, even if a cross-linking agent is added, a three-dimensional cross-linked structure cannot be obtained and the resin remains in a two-dimensional linear structure. Therefore, in order to maintain mechanical strength and resistance to solvents which will endure during practical use it has been necessary to greatly increase the molecular weight. However, in general, in order for the resin to be practically used as a finishing powder, it is most important that the resin has high thermal fluidity. If the molecular weight of the thermoplastic acrylic resin is reduced in order to obtain the high thermal fluidity, the mechanical strength and resistance to solvents are also greatly reduced and no practicable finishing powders are obtained.

Today conventional thermosetting acrylic resins are extensively used in solution-type paints which are made by including an aminoformaldehyde resin or epoxy resin as a cross-linking agent. However, for several reasons, thermosetting acrylic resins are not advantageously used as resins for a finishing powder. For example, when a conventional thermosetting acrylic resin is used for a finishing powder, it is very difficult to initiate a cross-linking reaction after the powder is heated to a fluid state and a smooth thermoset painted surface is not obtained. Another reason is that it is substantially difficult to produce a solid thermosetting acrylic resin which can be used for a finishing powder in a form containing no volatile ingredient. Presently known polymerization processes for producing thermoplastic acrylic solid resins include bulk-polymerization, suspension-polymerization and emulsion-polymerization. However, a thermosetting acrylic solid resin which can be used as a finishing powder is difficult to produce by any of these known polymerization processes.

More specifically, when a thermosetting acrylic is used in formation of a powdery thermosetting solid coating composition, unlike the case where it is used as a molding material, the weight average molecular weight (Mw) should not exceed about 100,000 and, by correlation, the number average molecular weight (Mn) should not exceed about 30,000. Thus, unless the number average molecular weight of a thermosetting acrylic solid resin for a finishing powder is controlled so as to be less than 30,000, the thermal fluidity or flowability is so low that the resin cannot be put into practical use. In that case, such a large amount of polymerization initiator is required that when attempting production by the bulk polymerization process, it is difficult to control the heat generated by the polymerization. When attempting production by the suspension-polymerization process, since the functional groups of the monomer impart high water-solubility, it is difficult to complete the polymerization while maintaining stability of the suspension state; therefore the suspension-polymerization process cannot be adopted to any great extent. When attempting the production by the emulsion-polymerization process, in practice, the emulsifier is mixed into the painted film and a weather proof painted film cannot be obtained.

SUMMARY

It is therefore an object of the present invention to provide a process for producing thermosetting finished powders wherein a solid thermosetting acrylic resin is used.

It is another object of the present invention to provide such thermosetting finishing powders which exhibit high thermal fluidity.

It is a further object of the present invention to provide such thermosetting finishing powders which overcome the deficiencies in thermal stability, resistance to solvents and adhesion to metals exhibited by vinyl chloride type resins.

It is still another object of the present invention to provide such thermosetting finishing powders which overcome the deficiency in durability to weathering exhibited by epoxy type resins.

It is yet another object of the present invention to provide such thermosetting finishing powders which overcome the deficiencies in mechanical strength and resistance to solvents exhibited by thermoplastic acrylic resins.

It is another object of the present invention to provide solid copolymers and processes for producing the same, which solid copolymers are useful in preparing such thermosetting finishing powders.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description. It has been found that the above objects can be attained by practicing the present invention.

One embodiment of the present invention includes a process for producing solid copolymers (a) having a glass transition point of from 5° to 60° C. and a number average molecular weight of from 1,500 to 30,000 by bulk-polymerizing a monomer mixture consisting of a cross-linkable monomer having the structure:

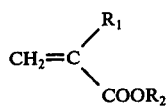

wherein $R_1$ is H or $CH_3$ and $R_2$ is an alkyl radical containing from 1 to 14 carbon atoms, in an amount at least 30% by weight based on the total monomers to be copolymerized, an ethylenic α, β unsaturated carboxylic acid monomer in an amount from 3 to 20% by weight based on the total monomers to be copolymerized and 0 to 67% by weight based on the total monomers to be copolymerized of a monomer copolymerizable with each of the above monomers, until conversion to the polymer is from 10 to 80% by weight and then adding a polymerization initiator and completing the polymerization by suspension-polymerization.

Another embodiment of the present invention includes a process for producing solid copolymers (b) having a glass transition point of from 5° to 60° C. and a number average molecular weight of from 1,500 to 30,000 by bulk-polymerizing a monomer mixture consisting of a cross-linkable monomer having the structure:

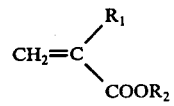

wherein $R_1$ is H or $CH_3$ and $R_2$ is an alkyl radical of containing from 1 to 14 carbon atoms, in an amount at least 30% by weight based on the total monomers to be copolymerized, a monomer having the structure:

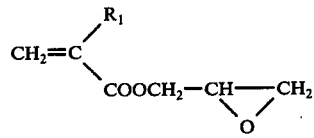

wherein $R_1$ is H or $CH_3$, in an amount from 3 to 40% by weight based on the total monomers to be copolymerized and a monomer copolymerizable with each of the above monomers in an amount of 0 to 67% by weight based on the total monomers to be copolymerized until conversion to the polymer is from 10 to 80% by weight and then adding a polymerization initiator and completing the polymerization by suspension-polymerization.

A thermosetting finishing powder is produced by mixing 40 to 5 parts by weight of an epoxy resin containing 2 or more epoxy radicals in the molecule and from 0.02 to 2.0 parts by weight of a tertiary amine having the structure:

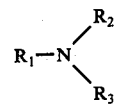

wherein each of $R_1$, $R_2$ and $R_3$ is alkyl containing from 1 to 8 carbon atoms or phenyl, or a derivative thereof, as a curing accelerator, with 60 to 95 parts by weight of the solid copolymer (a) produced by the above described process and then crushing the mixture to a powder. Also, a thermosetting finishing powder is produced by mixing 40 to 3 parts by weight of a cross-linking compound containing 2 or more equivalents of carboxyl radicals or acid anhydrides thereof in the molecule or 40 to 3 parts by weight of a cross-linking compound containing in the molecule at least 2 nitrogen atoms having adjacent thereto at least one active hydrogen (and thus containing at least two structures having the formula:

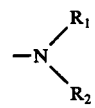

wherein one or both of $R_1$ and $R_2$ is hydrogen) with 60 to 97 parts by weight of the solid copolymer (b) produced by the respective above described process.

DESCRIPTION OF THE PREFERRED EMBODIMENTS

The present invention will be explained more particularly in the following detailed description.

The monomers which have the general formula:

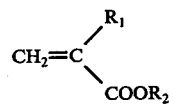

wherein $R_1$ is H or $CH_3$ and $R_2$ is an alkyl radical containing from 1 to 14 carbon atoms, which are used to produce solid copolymers (a) and (b) by the above-described processes of the present invention include, for example, methyl acrylate, ethyl acrylate, n-butyl acrylate, isobutyl acrylate, 2-ethylhexyl acrylate, methyl methacrylate, ethyl methacrylate, n-butyl methacrylate, isobutyl methacrylate, 2-ethylhexyl methacrylate, lauryl methacrylate and tridecyl methacrylates. These monomers impart excellent thermal stabilty and weatherability to the resulting thermosetting solid coating composition and at least one is used in the present invention. When the amount of said monomer used is less than 30% by weight based on the total monomers to be copolymerized, the durability against weathering, metal adhesion and thermal stability of the obtained finish are reduced.

The ethylenic α, β unsaturated carboxylic acid monomers used in the above described process to obtain solid copolymer (a) include acrylic acid, methacrylic acid, itaconic acid, crotonic acid, fumaric acid and maleic anhydride. These monomers react with the epoxy resin to cause thermosetting and improve solvent resistance of the resulting thermosetting solid coating composition and at least one of the monomers is used. If the amount of said ethylenic α, β unsaturated carboxylic acid monomer used is less than 3% by weight based on the total monomers to be copolymerized, it does not measurably contribute to an improvement of solvent resistance and mechanical strength. On the other hand, if the amount exceeds 20% by weight, the thermal fluidity is reduced and no smooth painted surface is obtained. Also, in this instance, the monomer would tend to react with the epoxy resin during mixing by melt-kneading to cause undesired gelation.

The monomers having the general formula:

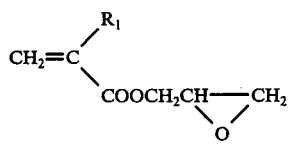

wherein $R_1$ is H or $CH_3$, which are used in the above described process to obtain solid copolymer (b) are glycidyl acrylate and glycidyl methacrylate. These monomers react with either of the above described cross-linking compounds, e.g. when the coating composition is actually applied, and also contribute to the improvements in solvent resistance and mechanical strength of the finishing powders obtained by the present invention. If the amount of this monomer used is less than 3% by weight of the total monomers to be copolymerized, no sufficient cross-linking reaction can be expected and therefore the solvent resistance and mechanical strength of the obtained finishing powder are low. On the other hand, if the amount exceeds 40% by weight, the cross-linking reaction occurs while the heat flow is insufficient in the baking step after painting and also the smoothness of the painted surface is poor.

In the solid copolymer (a) or (b) obtained by the above described processes, it is very important for the practical use of the finishing powder to limit the ranges of the glass transition point and the number average molecular weight. If the glass transition point is below 5° C., the produced finishing powder tends to be sticky and cohere and therefore cannot be used in practice. When it exceeds 60° C., the thermal fluidity is too low for practical use. Further, if the number average molecular weight is less than 1500, the solvent resistance and mechanical strength are reduced. When it exceeds 30,000, the thermal fluidity becomes so low that a smooth painted surface is not obtained.

The monomers copolymerizable with each of the above described monomers include, for example, styrene, α-methyl styrene, vinyl toluene, vinyl chloride, vinylidene chloride, acrylonitrile, methacrylonitrile, vinyl acetate, vinyl propionate, β-hydroxyethyl acrylate and β-hydroxypropyl methacrylate. However, when their amount exceeds 67% by weight, the durability against weathering, metal-adhesion and thermal stability of the product are reduced. Furthermore, the amount of these monomers must also satisfy the limiting conditions of the glass transition point and number average molecular weight of the resultant copolymers.

In the present invention, in producing solid copolymers (a) and (b), the mixture of the monomers is copolymerized at a temperature of from 80° to 150° C., preferably 100° to 130° C., by a bulk-polymerization process until conversion to the polymer has reached 10 to 80% by weight, then suspension-polymerization is carried out. If conversion to the polymer is less than 10% by weight, and if suspension-polymerization is then used, the cross-linkable monomers as described above are so highly water-soluble that they dissolve into the water layer and it is difficult to maintain a favorable suspension state and a solid copolymer suitable for use for the finishing powder of the present invention is not obtained. On the other hand, if conversion to the polymer by bulk-polymerization is above 80% by weight it is difficult to maintain the number average molecular weight below 30,000 and the thermal fluidity of the copolymer is lowered. The temperature adopted for the suspension polymerization will vary depending on the polymerization initiator used but in general will range between 60° and 100° C.

In the suspension-polymerization step of the present invention, in either of the above described processes for producing copolymers (a) and (b), the polymerization initiators used are conventional radical polymerization initiators, for example, organic peroxides represented by benzoyl peroxide and lauroyl peroxide and azobisnitriles such as azobisisobutylonitrile. The polymerization initiator is used in an amount of from 0.5 to 5.0% by weight of the total monomers to be copolymerized. However, it is possible to add a portion of the polymerization initiator in a range allowing for control of the polymerization heat in the bulk-polymerization step. Use of the polymerization initiator is effective for adjusting the number average molecular weight of the polymer obtained after completion of the suspension polymerization step of the process of the invention. In either of the bulk-polymerization and/or suspension-polymerization steps, the number average molecular weight can be further adjusted, if necessary, between 1,500 to 30,000 by using less than 5% by weight of a chain transfer agent such as a mercaptan, for example, primary or tertiary dodecylmercaptan, a disulfide, for example, diisopropylxanthogen disulfide, a diazothioether or a halide.

In the suspension polymerization step by either process for obtaining copolymer (a) and (b), the dispersing agents used are high molecular weight organic substances such as gelatin, tragacanth, starch, methyl cellulose and carboxymethyl cellulose and synthetic high molecular weight substances such as polyvinyl alcohols, partially saponified polyvinyl alcohols, polyacrylates and polyacrylamides, inorganic salts such as $BaSO_4$, $CaSO_4$, $CaCO_3$, $MgCO_3$ and $Ca_3(PO_4)_2$, inorganic high molecular weight substances such as talc, bentonite, silicic acid, diatomaceous earth and clay and metals and metal oxides, that are known as dispersing agents. in suspension-polymerization. Further, such known salts as NaCl. KCl and $Na_2SO_4$ and surface active agents of the anionic, cationic and nonionic types may be simultaneously used as dispersing assistants.

In the present invention, a two-stage polymerization by bulk-polymerization and suspension-polymerization is used, so that the greater part of the above described cross-linkable monomers which are highly water-soluble may be introduced into the polymer chains during the bulk-polymerization step so as to be insoluble in water and therefore, in the suspension-polymerization stage, it is possible to maintain a favorable suspension state, a favorable pearly polymer which can be used substantially as a thermosetting finishing powder is obtained and it is also possible to adjust the number average molecular weight of the polymer within a range of 1,500 to 30,000.

By each of the above described processes for obtaining copolymers (a) and (b), a solid copolymer according to the present invention is obtained. A thermosetting finishing powder is produced by dehydrating the copolymer, then drying it with a fluid layer dryer, air current dryer or hot-air dryer and then mixing it with such cross-linking agent to be used in the present invention as will be seen in the following.

Typical epoxy resins which have two or more epoxy radicals in the molecule and which are cross-linking agents to be mixed with the solid copolymer (a) obtained by the above described process are: polyvalent epoxy compounds obtained by the condensation of bisphenol A and epichlorohydrin or β-methylepichlorohydrin; polyvalent epoxy compounds obtained by the condensation of a novolak or resol and epichlorohydrin; diepoxy compounds having a polyether in the skeleton; and alicyclic epoxy compounds.

When the sum of the solid copolymer (a) and the epoxy resin cross-linking agent is considered as 100%, if the amount of the epoxy resin is less than 5%, the solvent resistance and mechanical strength of the obtained thermosetting finishing powder become poor and, if it exceeds 40% by weight, the durability against weathering is unsatisfactory. In this embodiment it is preferable to add a curing accelerator to the mixture. The above described tertiary amine curing accelerators and derivatives thereof include, for example, trimethylamine, triethylamine, triisopropylamine, dimethylbenzylamine, triethylammonium chloride, triisopropylammonium chloride, dimethylbenzylammonium chloride, triethylamine sulfonate and boron trifluoride-triethylamine complex compound. They are used preferably in an amount from 0.02 to 2.0 parts by weight per 100 parts by weight of the resin solid. The use of this amine component promotes the thermosetting reaction between the carboxylic acid of the solid copolymer (a) and the epoxy group at the time of actual application. If the amount of amine component is less than 0.02 part by weight, the solvent resistance of the resulting thermosetting coating composition is insufficient and if the amount exceeds 2.0 parts by weight, the viscosity increases extremely at the time of the mixing operation so that it is difficult to obtain a powdery composition and thermal stability is lowered.

The solid copolymer (a) and the epoxy resin are put into a heatable mixing machine such as, for example, an extruder, a co-kneader or a Henschel type mixer, and melted and mixed at a temperature in the range of 120° to 200° C. In this operation the solid copolymer (a) and the epoxy resin may be mixed and melted simultaneously, or it is possible to premelt one of the two components and then mix the melt with the second component. In either method, the obtained melt is cooled, if necessary, to a temperature not exceeding 150° C. and then the curing accelerator is added and mixed therewith. When the mixture consistency becomes uniform, it is cooled and crushed.

When the temperature in the above initial mixing is below 120° C., it is difficult to melt and mix the components uniformly. When the temperature exceeds 200° C., the copolymer (a) tends to be depolymerized. Further, when the mixing temperature of the curing accelerator exceeds 150° C., a cross-linking reaction tends to occur during the mixing and the thermal fluidity of the finishing powder is reduced. Therefore, it is necessary to keep this mixing temperature at 150° C. or below.

The cross-linking compounds which contain two or more equivalents of a carboxyl radical or acid anhydride thereof in the molecule and which are mixed with solid copolymer (b), include such polyvalent carboxylic acid compounds as phthalic anhydride, isophthalic acid, adipic acid, succinic acid, sebacic acid, citric acid, itaconic acid, aconitic acid, maleic anhydride, fumaric acid, trimellitic anhydride, hexahydrophthalic acid, tetrahydrophthalic anhydride, dodecenyl succinic anhydride, pimelic acid and pyromellitic anhydride, polyester resins having two or more carboxyl radicals in the molecule which are obtained by esterification of these polyvalent carboxylic acid compounds with polyhydric alcohols, and solid copolymers (a) wherein two or more ethylenic α, β unsaturated carboxylic acid monomers are copolymerized in the molecule.

The cross-linking compounds which contain two or more nitrogen atoms having one or two active hydrogen atoms adjacent thereto in the molecule include cyclohexylaminopropylamine, methaphenylene diamine, p,p'-diaminodiphenyl methane, p,p'-diaminodiphenyl sulfone, dicyandiamide, polyamide resins having in the molecule at least two amide groups and epoxy-amine adducts containing in the molecule at least two nitrogen atoms adjacent to an active hydrogen atom, which are obtained by reacting an amine with an epoxy resin.

Both of the above types of cross-linking compounds exhibit compatability with the above solid copolymer (b) when rendered molten by heating but they do not react with the copolymer to cause cross-linking before they are rendered molten. It is also necessary that they do not exhibit viscosity or stickiness when admixed with the solid copolymer (b). An appropriate selection of a desired cross-linking compound having these properties is made dependent upon the composition, glass transition point and number average molecular weight of the solid copolymer (b).

When the amount of the cross-linking agent is less than 3% by weight of the total weight of cross-linking agent and copolymer (b), no sufficient thermosetting occurs and therefore the solvent resistance and mechanical strength are low. When the amount exceeds 40% by weight, the durability against weathering is reduced, and the thermal fluidity is greatly reduced in some cases.

The solid copolymer (b) and the cross-linking compound are mixed together and then crushed or ground at room temperature or below, e.g. at 0° to 30° C., to a powder, e.g. of 40 to 300 mesh. In cases when the cross-linking compound is a liquid or viscous mass rather than a solid, the solid copolymer (b) is preferably rendered molten, e.g. by means of a kneader capable of high agitation and heating, the cross-linking compound is incorporated in the melt and the mixture is then cooled to room temperature or below, e.g. to 20° to 30° C. and crushed or ground to a powder, e.g. of 40 to 300 mesh.

The thermosetting finishing powders of the present invention when applied as a coating may also include inorganic fillers such as titanium oxide, iron oxide, silica, calcium carbonate or barium sulfate, organic pigments such as carbon black, phthalocyanine blue or Sincasia red, modified cellulose such as cellulose acetate butyrate, methoxycellulose or ethoxycellulose, a plasticizer such as dibutyl phthalate, dioctyl phthalate or epoxidized oil or other additives such as silicone or wax. They are mixed with the powders by a dry-blending process, semi-dry-blending process or melt-blending process, and are then crushed to a powder. In the embodiment of the present invention wherein the amine curing accelerator is used, the above-additives are preferably incorporated prior to mixing of the curing accelerator because the time required for mixing is substantially lengthened if the curing accelerator is added first. Then the thermosetting finishing powder produced by the above described method is applied as a coating on a base material such as a metal and is then baked for from 5 to 60 minutes within a dryer at 160° to 220° C. to obtain a thermoset painted film which is high in thermal fluidity during baking and is excellent in thermal stability, solvent resistance, metal-adhesion, mechanical strength and durability against weathering.

The present invention will be more fully understood with reference to the following examples.

EXAMPLE 1

Examples 1 and 2 show a process for using a solid copolymer obtained by copolymerizing an ethylenic α, β unsaturated carboxylic acid monomer in producing a thermosetting finishing powder.

Raw materials used in a bulk-polymerization according to each of runs (A) to (E) shown in Table I were put into an autoclave reactor having a capacity of 4 liters and equipped with an agitator, reflux condenser, thermometer and nitrogen inlet. The air in the reactor was replaced with nitrogen. The mixture of raw materials described in the table was heated and the temperature was kept at 110° to 120° C. with agitation. Each bulk-polymerization was carried out to obtain conversions to the polymer and for the polymerization times shown in the table. When the bulk-polymerization was completed, the reaction product was cooled and was agitated with the addition of polymerization initiator, dispersing agent and ion-exchanged water as indicated in the table. The polyvinyl alcohol used had a saponification degree of 80%. While the reaction product was kept suspended, suspension-polymerization was carried out at the temperatures and times shown in Table I. The obtained product was washed with water and dried with a vacuum dryer to obtain a pearly copolymer having a grain diameter of 50 to 150 meshes per inch. The glass transition points and number average molecular weights of the respective obtained copolymers are also shown in the table.

TABLE I

| | | A | B | C | D | E |
|---|---|---|---|---|---|---|
| Raw materials at the time of the bulk-polymerization (in parts by weight) | Ethyl acrylate | | 450 | | | |
| | n-butyl acrylate | 224 | | | | 100 |
| | 2-ethylhexyl acrylate | | | 150 | | |
| | Methyl methacrylate | | | | 550 | |
| | Ethyl methacrylate | | | 180 | | |
| | n-butyl methacrylate | | 100 | | | 450 |
| | Isobutyl methacrylate | 676 | | | | |
| | Lauryl methacrylate | | | 150 | 250 | |
| | Styrene | | 350 | | | |
| | α-methylstyrene | | | 450 | | |
| | Vinyl toluene | | | | | 400 |
| | Acrylonitrile | | | | 50 | |
| | Vinyl acetate | | | | 100 | |
| | Acrylic acid | | | 70 | | |
| | Methacrylic acid | 100 | 100 | | | |
| | Itaconic acid | | | | 50 | |
| | Maleic anhydride | | | | | 50 |
| | n-butylmercaptan | | 5 | | | |
| | n-dodecylmercaptan | | | | | 10 |
| | Tertiary dodecylmercaptan | | | 10 | | |
| | Diisopropylxanthogendisulfide | | | | 10 | |
| Period of time in the bulk-polymerization (in hours) | | 2 | 4 | 5 | 4 | 4 |
| Conversion to polymer when bulk-polymerization was stopped (in % by weight) | | 21.7 | 40.6 | 45.2 | 36.6 | 34.7 |
| Raw materials at the time of the suspension-polymerization (in parts by weight) | Azobisisobutylonitrile | | 30 | | | |
| | Benzoyl peroxide | 35 | | | | 40 |
| | Lauroyl peroxide | | | 40 | | |
| | Parachlorobenzoyl peroxide | | | | 40 | |
| | Polyvinyl alcohol | | | | 20 | |
| | Tricalcium phosphate | | 10 | 10 | | 20 |
| | Ion-exchanged water | 3000 | 3000 | 3000 | 3000 | 3000 |
| Temperature in the suspension polymerization (in ° C) | | 90 | 80 | 90 | 90 | 90 |
| Period of time in the suspension-polymerization (in hours) | | 6 | 7 | 5 | 5 | 6 |
| Glass transition point of the solid copolymer (in ° C) | | 25 | 28 | 33 | 33 | 38 |
| Number average molecular weight of the solid copolymer | | 21000 | 6800 | 10200 | 6300 | 5900 |

EXAMPLE 2

Using the solid copolymers A-E obtained in Example 1, thermosetting finishing powders were produced by the following process.

The solid copolymer and titanium oxide were put into a Henschel type mixer, and were melted and blended according to the conditions shown in Table 2. Then the epoxy resin shown in the table was mixed therewith. After the melted mixture was cooled to a temperature of from 110° to 120° C., the curing accelerator shown in the table was mixed therewith. Then the melted mixture was immediately cooled and was crushed with a crusher. The powder passing through a sieve of 150 meshes per inch was collected to produce a thermosetting finishing powder shown in each of Runs 1-7 in the table. All of the numerical values in the table with the exception of the blending temperatures indicate parts by weight.

TABLE II

| Run No. | 1 | 2 | 3 | 4 | 5 | 6 | 7 |
|---|---|---|---|---|---|---|---|
| Titanium oxide | 50 | 50 | 50 | 50 | 50 | 50 | 50 |
| Solid copolymer (A) | 80 | | 85 | | | | |
| Solid copolymer (B) | | 80 | | | | | |
| Solid copolymer (C) | | | | 85 | | | |
| Solid copolymer (D) | | | | | 75 | 85 | |
| Solid copolymer (E) | | | | | | | 95 |
| Blending temperature (° C) | 180 | 170 | 180 | 160 | 160 | 160 | 160 |
| Epikote 820 *1 | 20 | | | | | | 10 |
| Epikote 834 *1 | | | 15 | | | | |
| Epikote 1001 | | | | 25 | | | |
| DEN 431 *2 | | 20 | | | | | |
| Unox T-206 *3 | | | 15 | | | | |
| Epichlon 800 *4 | | | | | | 15 | |
| BF$_3$ dimethylbenzylamine complex compound | 1.5 | | | | | | |
| Triisopropylamine | | 0.2 | | 1.0 | | | |
| Triethylammonium chloride | | | 1.0 | | 1.5 | | 2.0 |
| Triethylamine paratoluene sulfonate | | | | | | 1.5 | |

In the above table:
(1) *1 is a trade name of an epoxy resin produced by Shell Chemical Company, Britain.
(2) *2 is a trade name of an epoxy resin produced by Dow Chemical Company, U.S.A.
(3) *3 is a trade name of an epoxy resin produced by Union Carbide Company, U.S.A.
(4) *4 is a trade name of an epoxy resin produced by Dainippon Ink Chemical Company, Japan.

The characteristic evaluations of the thermosetting finishing powders obtained by the present invention and shown in Runs 1–7 in the above table are shown in the following Table 3.

On steel plates of a thickness of 0.8 mm. treated with zinc phosphate each of the thermosetting finishing powders 1 to 7 shown in the above table and such controls as an epoxy resin finishing powder, vinyl chloride resin finishing powder and thermoplastic acrylic resin finishing powder were painted with an electrostatic powder coating machine and then baked for 20 minutes in a hot-air dryer adjusted to a temperature of 200° C. The obtained respective test plates were evaluated respective to the characteristics of each painted film on the test plates. The results are collectively shown in the table. Tested powders 1–7 represent the present invention and the remaining powders are prior art powders for control and comparison purposes.

TABLE III

| Tested films | Film characteristcs | | | |
|---|---|---|---|---|
| | Thickness (in μ) | Thermal fluidity$_4$ (Smoothness) | Solvent Resistance$_5$ (Methyl ethyl ketone) | Thermal stability$_6$ (Yellowing when rebaked) |
| 1 | 89 | Good | Unchanged | None |
| 2 | 85 | Good | Unchanged | None |
| 3 | 83 | Good | Unchanged | None |
| 4 | 80 | Good | Unchanged | None |
| 5 | 84 | Good | Unchanged | Slight Yellowing |
| 6 | 86 | Good | Unchanged | Slight Yellowing |
| 7 | 82 | Good | Unchanged | None |
| Epoxy powder$_1$ | 82 | Good | Unchanged | Quite Yellow |
| Vinyl chloride powder$_2$ | 130 | Good | Paint film dissolved | Very Yellow |
| Thermoplastic acrylic powder$_3$ | 84 | Good | Paint film dissolved | None |

| Tested Films | Film characteristcs | | | | Weather-O-Meter irradiation |
|---|---|---|---|---|---|
| | Mechanical | Metal strength$_7$: | Weathering durability$_9$: adhesion$_8$: | | |
| | Du pont impact test | Cross-cut test | % Gloss retention | Degree of Yellowing | |
| 1 | No cracks | No peeling | 90 | None | |
| 2 | No cracks | No peeling | 81 | None | |
| 3 | No cracks | No peeling | 85 | None | |
| 4 | Slight cracking | No peeling | 84 | None | |
| 5 | No cracks | No peeling | 82 | None | |
| 6 | No cracks | No peeling | 88 | None | |
| 7 | No cracks | No peeling | 84 | None | |
| Epoxy powder$_1$ | No cracks | No peeling | 46 | Substantial Yellowing | |
| Vinyl chlorde powder$_2$ | No cracks | Peeling over entire surface | 76 | None | |
| Thermoplastic acrylic | Substantial cracking | Partially peeled | 90 | None | |

TABLE III-continued powder₃

In the above table:

₁The epoxy resin finishing powder was prepared by mixing dicyandiamide in an epoxy resin (Epikote 1004 produced by Shell Chemical Company).

₂The vinyl chloride finishing powder was prepared by mixing dioctyl phthalate in vinyl chloride resin.

₃The thermoplastic acrylic resin finishing powder was prepared by using a thermoplastic acrylic resin consisting of methyl methacrylate and n-butyl acrylate and having a number average molecular weight of 32,000 and a glass transition point of 52° C.

₄The thermal fluidity values are the result of judging the smoothness of the painted surface of the test plate with the naked eye.

₅The solvent resistance values are the result of judging the degree of softening and the surface state after dipping the test plate in methyl ethyl ketone at 30° C. for 1 hours.

₆The thermal stability values are the result of judging the degree of yellowing after heating the test plate at 200° C. for 30 minutes.

₇The mechanical strength values are the result of judging the cracking of the painted film after dropping a load of 500 grams onto the test plate from a height of 30 cm. by using a striking core of a diameter of ½ inch with a Du Pont impact tester.

₈The metal-adhesion values are the result of making 11 cuts at intervals of 1 mm. in each of the longitudinal and lateral directions on the painted surface of the test plate with a microknife and pasting an adhesive tape on the surface and judging whether or not the tape peeled off when it was attempted to peel it off.

₉The weathering durability values are the result of keeping the test plate in a Sunshine Weather-O-Meter for 300 hours and judging the gloss retention rate and the degree of discoloration.

EXAMPLE 3

Examples 3 and 4 show a process for using a solid copolymer obtained by copolymerizing a glycidyl acrylate or glycidyl methacrylate monomer in producing a thermosetting finishing powder.

The raw materials used for the bulk-polymerization step, shown in the following Table IV under Runs F to I, were put into an autoclave reactor having a capacity of 4 liters and provided with an agitator, reflux condenser, thermometer and nitrogen inlet. The air in the reactor was replaced with nitrogen. The mixture was heated and the temperature was kept at 110° to 120° C. with agitation. Each bulk-polymerization step was continued until the conversion to the polymer shown in the table was reached.

As soon as the bulk-polymerization step was completed, the reaction product was cooled and then agitated with addition of the amounts of polymerization initiator, dispersing agent and ion exchanged water shown in the table. While the product was kept suspended, suspension-polymerization was carried out under the conditions shown in the table. The obtained product was washed with water and then dried with a vacuum dryer to obtain a pearly copolymer having a grain diameter of 50 to 150 meshes per inch. The glass transition points and number average molecular weights of the respective obtained polymers are also shown in the table. The polyvinyl alcohol used had a saponification degree of 80%.

TABLE IV

| | Run No. | F | G | H | I |
|---|---|---|---|---|---|
| Raw materials at the time of the bulk-polymerization (in parts by weight) | Ethyl acrylate | | 200 | | |
| | n-butyl acrylate | | | | 100 |
| | Methyl methacrylate | 450 | | | |
| | Ethyl methacrylate | | | 600 | |
| | n-butyl methacrylate | 350 | | | |
| | Isobutyl methacrylate | | | | 300 |
| | 2-ethylhexyl methacrylate | | 150 | | |
| | Tridecyl methacrylate | | | | 100 |
| | β hydroxyethyl methacrylate | 20 | | | |
| | Glycidyl methacrylate | 180 | | | 100 |
| | Glycidyl acrylate | | 150 | 200 | |
| | Styrene | | | | 300 |
| | Vinyl toluene | | 500 | | |
| | Methacrylonitrile | | | | 100 |
| | Vinyl propionate | | | 200 | |
| | Diisopropylxanthogen disulfide | 5 | | | |
| | Tertiary dodecyl mercaptane | | 5 | | |
| | Cumene hydroperoxide | | | 3 | |
| | Diazo thioether | | | | 5 |
| Period of time of the bulk-polymerization (in hours) | | 6 | 5 | 2 | 2 |
| Conversion to polymer when the bulk-polymerization was finished (in % by weight) | | 28.0 | 34.0 | 40.2 | 15.5 |
| Raw materials at the time of the suspension-polymerization (in parts by weight) | Azobisisobutylonitrile | 30 | | | |
| | Benzoyl peroxide | | 25 | | |
| | Methyl ethyl ketone peroxide | | | 30 | |
| | Tertiary butyl perbenzoate | | | | 40 |
| | Polyvinyl alcohol | 30 | | | |
| | Tricalcium phosphate | | 30 | | |
| | Dibasic calcium phosphate | | | 45 | 50 |
| | Ion-exchange water | 3000 | 3000 | 3000 | 3000 |
| Temperature in the suspension-polymerization (in ° C) | | 80 | 90 | 75 | 100 |
| Period of time of the suspension-polymerization (in hours) | | 6 | 6 | 10 | 11 |
| Glass transition point of the solid copolymer (in 20 C) | | 24 | 28 | 34 | 39 |
| Number average molecular weight of the solid copolymer | | 7800 | 11000 | 15200 | 7100 |

EXAMPLE 4

The solid copolymers F-I obtained in Example 3 were made into thermosetting finishing powders by the following method.

The solid copolymer and titanium oxide were put into a Henschel type mixer and were melted and mixed according to Run Nos. 8-13 shown in the following Table V. Then a cross-linking agent as shown in the table was mixed into the melted mixture. When a curing accelerator was added, it was mixed after the melted mixture was cooled to a temperature in the range of 100° to 120° C.

The melted mixture was then immediately cooled and crushed with a crusher. The powder passing through a sieve of 150 meshes per inch was collected to produce the thermosetting finishing powders. All the numerical values in the table with the exception of the blending temperature indicate parts by weight.

The characteristic evaluation of the thermosetting finishing powders obtained by the present invention and described in Runs 8-13 of Example 4 are shown in the following Table VI. The thermosetting finishing powders 8-13 and an epoxy resin finishing powder, vinyl chloride resin finishing powder and thermoplastic acryl resin finishing powder for comparison purposes were painted with an electrostatic powder painting apparatus onto steel plates, having a thickness of 0.8 mm. and treated with zinc phosphate, and were further baked for 20 minutes with a hot-air dryer adjusted to a temperature of 200° C. to obtain the respective test plates. The results are collectively shown in the table. The finishing powders used for comparison and the testing methods were the same as used in Example 2 and as shown in Table III.

TABLE V

| Run No. | 8 | 9 | 10 | 11 | 12 | 13 |
|---|---|---|---|---|---|---|
| Titanium oxide | 50 | 50 | 50 | 50 | 50 | 50 |
| Solid copolymer (F) | 90 | | | | 60 | |
| Solid copolymer (G) | | 92 | | | | |
| Solid copolymer (H) | | | 90 | | | 80 |
| Solid copolymer (I) | | | | 90 | | |
| Blending temperature (in ° C) | 160 | 150 | 150 | 160 | 160 | 160 |
| Hexahydrophthalic anhydride | | | 10 | | | |
| Trimellitic anhydride | 10 | | | | | |
| P,P'-diaminodiphenylmethane | | | | 15 | | |
| Dicyandiamide | | 18 | | | | |
| Ethyleneglycol diadipate | | | | | | 20 |
| Solid copolymer (A) | | | | | 40 | |
| Dibutyl tin laurate | | 0.5 | | | | |
| Monoethylamine BF₃ complex | | | 0.5 | | | 65 |
| Dimethyl benzylamine | | | | | | 1.0 |
| Salicylic acid | | | | 0.1 | | |

TABLE VI

| | Film characteristics | | | |
|---|---|---|---|---|
| Tested films | Thickness (in/μ) | Thermal fluidity (Smoothness | Solvent Resistance (Methyl ethyl ketone) | Thermal stability (Yellowing when rebaked) |
| 8 | 80 | Good | Unchanged | None |
| 9 | 85 | Good | Unchanged | Slight Yellowing |
| 10 | 82 | Good | Unchanged | None |
| 11 | 88 | Good | Unchanged | Slight Yellowing |
| 12 | 83 | Good | Unchanged | None |
| 13 | 90 | Good | Unchanged | None |
| Epoxy powder | 82 | Good | Unchanged | Slight Yellowing |
| Vinyl chloride powder | 130 | Good | Paint film dissolved | Very Yellow |
| Thermoplastic acrylic powder | 84 | Good | Paint film dissolved | None |

| | Film characteristics | | | |
|---|---|---|---|---|
| | Mechanical strength | Metal adhesion: | Weathering durability: Weather-O-Meter irradiation | |
| Tested films | Du Pont impact test | Cross-cut test | % Gloss retention | Degree of Yellowing |
| 8 | Slight cracking | No peeling | 92 | None |
| 9 | No cracks | No peeling | 81 | None |
| 10 | No cracks | No peeling | 94 | None |
| 11 | No cracks | No peeling | 86 | Slight Yellowing |
| 12 | No cracks | No peeling | 91 | None |
| 13 | No cracks | No peeling | 88 | None |
| Epoxy powder | No cracks | No peeling | 46 | Substantial Yellowing |
| Vinyl chloride powder | No cracks | Peeling over entire surface | 76 | None |
| Thermoplastic acrylic powder | Substantial cracking | Partially peeled | 90 | None |

What is claimed is:

1. A process for producing a solid copolymer having a glass transition point of from 5° to 60° C and a number average molecular weight of from 1,500 to 30,000 which comprises copolymerizing a mixture of:
    A. at least 30% by weight of total monomers of a monomer having the formula:

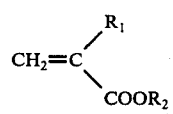

wherein $R_1$ is selected from the group consisting of H and $CH_3$ and $R_2$ is an alkyl radical containing from 1 to 14 carbon atoms;

B. a member selected from the group consisting of
1. from 3 to 20% by weight of total monomers of a monomer selected from the group consisting of ethylenic $\alpha,\beta$ unsaturated mono and dicarboxylic acids and anhydrides thereof,
2. from 3 to 40% by weight of total monomers of a monomer selected from glycidyl acrylate and glycidyl methacrylate; and
c. from 0 to 67% by weight of total monomers of an ethylenically monounsaturated monomer copolymerizable with said monomers (A) and (B), the mixture being first bulk-polymerized until conversion to the copolymer is from 10% to 80% by weight and polymerization then being completed by suspension-polymerization in the presence of an effective amount of a polymerization initiator.

2. The process according to claim 1 wherein said member (B) is a monomer selected from the group consisting of ethylenic $\alpha,\beta$ unsaturated mono and dicarboxylic acids and anhydrides thereof.

3. The process according to claim 1 wherein said member (B) is a monomer selected from the group consisting of glycidyl acrylate and glycidyl methacrylate.

4. The process according to claim 1 wherein said monomer (C) is selected from the group consisting of styrene, $\alpha$-methyl styrene, vinyl toluene, vinyl chloride, vinylidene chloride, acrylonitrile, methacrylonitrile, vinyl acetate, vinyl propionate, $\beta$-hydroxyethyl acrylate, $\beta$-hydroxypropyl methacrylate and mixtures thereof.

5. A thermosetting solid coating composition which comprises a powdery mixture prepared by mixing together and then crushing or grinding at a temperature of 0° to 30° C. to a powder:
a. 60 to 97% by weight of total mixture of a solid copolymer having a glass transition point of from 5° to 60° C. and a number average molecular weight of from 1,500 to 30,000 which comprises the copolymer of:
A. at least 30% by weight of total monomers of a monomer having the formula:

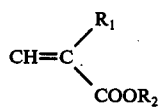

wherein $R_1$ is selected from the group consisting of H and $CH_3$ and $R_2$ is an alkyl radical containing from 1 to 14 carbon atoms;
B. from 3 to 40% by weight of total monomers of a monomer selected from glycidyl acrylate and glycidyl methacrylate; and
C. from 0 to 67% by weight of total monomers of an ethylenically monounsaturated monomer copolymerizable with said monomers (A) and (B), said solid copolymer being obtained by first bulk polymerizing said monomers until conversion to the copolymer is from 10% to 80% by weight and then completing polymerization by suspension-polymerization in the presence of an effective amount of a polymerization initiator; and b. 40 to 3% by weight of total mixture of a cross-linking compound consisting of a compound containing in the molecule at least two radicals selected from the group consisting of carboxyl radicals and carboxylic acid anhydride radicals, said cross-linking compound being compatible with said solid copolymer when rendered molten by heating but not reacting with said solid copolymer to cause cross-linking before both said solid copolymer and said cross-linking agent are rendered molten, said powdery mixture being free of stickiness, high in thermal fluidity during baking when applied as a coating to a base material, and high in thermal stability, resistance to solvents, adhesion, mechanical strength and durability against weathering when it has been thermoset.

6. A thermosetting solid coating composition which comprises a powdery mixture prepared by mixing together and then crushing or grinding at a temperature of 0° to 30° C. to a powder:
a. 60 to 97% by weight of total mixture of a solid copolymer having a glass transition point of from 5° to 60° C. and a number average molecular weight of from 1,500 to 30,000 which comprises the copolymer of:
A. at least 30% by weight of total monomers of a monomer having the formula:

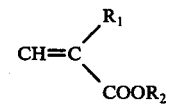

wherein $R_1$ is selected from the group consisting of H and $CH_3$ and $R_2$ is an alkyl radical containing from 1 to 14 carbon atoms;
B. from 3 to 40% by weight of total monomers of a monomer selected from glycidyl acrylate and glycidyl methacrylate; and
C. from 0 to 67% by weight of total monomers of an ethylenically monounsaturated monomer copolymerizable with said monomers (A) and (B), said solid copolymer being obtained by first bulk polymerizing said monomers until conversion to the copolymer is from 10% to 80% by weight and then completing polymerization by suspension-polymerization in the presence of an effective amount of a polymerization initiator; and
b. 40 to 3% by weight of total mixture of a cross-linking compound consisting of a compound containing in the molecule at least two nitrogen atoms each having adjacent thereto at least one active hydrogen atom, said cross-linking compound being compatible with said solid copolymer when rendered molten by heating but not reacting with said solid copolymer to cause cross-linking before both said solid copolymer and said cross-linking agent are rendered molten, said powdery mixture being free of stickiness, high in thermal fluidity during baking when applied as a coating to a base material, and high in thermal stability, resistance to solvents, adhesion, mechanical strength and durability against weathering when it has been thermoset.

* * * * *